(12) United States Patent
Wait

(10) Patent No.: US 7,364,604 B2
(45) Date of Patent: Apr. 29, 2008

(54) GAS/LIQUID SEPARATION UTILIZING BUNCHED MESH MATERIALS

(75) Inventor: David L. Wait, Westlake Village, CA (US)

(73) Assignee: The Boeing Company, Chicago, IL (US)

( * ) Notice: Subject to any disclaimer, the term of this patent is extended or adjusted under 35 U.S.C. 154(b) by 458 days.

(21) Appl. No.: 11/093,893

(22) Filed: Mar. 30, 2005

(65) Prior Publication Data

US 2006/0227843 A1    Oct. 12, 2006

(51) Int. Cl.
*B01D 19/00* (2006.01)
*H01S 3/095* (2006.01)

(52) U.S. Cl. .............. 95/260; 95/287; 96/215; 96/202; 96/219; 55/485; 372/89

(58) Field of Classification Search .......... 95/260, 95/287; 96/215, 202, 219; 55/485, 482; 372/89, 55, 90, 51, 54
See application file for complete search history.

(56) References Cited

U.S. PATENT DOCUMENTS 5,624,654 A * 4/1997 Clendening et al. ........ 423/579
5,756,047 A * 5/1998 West et al. .................. 422/37

FOREIGN PATENT DOCUMENTS

JP            04276110 A   * 10/1992

* cited by examiner

*Primary Examiner*—Duane Smith
*Assistant Examiner*—Douglas J Theisen
(74) *Attorney, Agent, or Firm*—MacPherson Kwok Chen & Heid LLP; David S. Park

(57) ABSTRACT

An apparatus and method for gas/liquid separation on an array of jets or streams of liquid is provided. Layers of substantially spherical aggregates of meshed material are provided to "quiet" high-velocity liquid flow with entrained gas to provide a uniform flow at moderate or low velocity from which the gas has been substantially separated from the liquid.

20 Claims, 3 Drawing Sheets

GAS/LIQUID SEPARATION UTILIZING BUNCHED MESH MATERIALS

CROSS-REFERENCE TO RELATED APPLICATIONS

This application is related to U.S. application Ser. No. 11/093,928, now allowed filed Mar. 30, 2005, which is incorporated herein by reference in its entirety.

TECHNICAL FIELD

The present invention relates generally to separators and, more particularly, to gas/liquid separators for chemical lasers.

BACKGROUND

Laser beams are generated by means of a population inversion consisting of an unstable abundance of molecules having excited high energy electronic states which release photons as they decay to the equilibrium lower energy states of the optically active media.

In high energy chemical lasers, the excited electronic states are generated by a chemical reaction. For example, one such reaction involves the use of excited molecular oxygen, hereinafter referred to as singlet delta oxygen (SDO) or $O_2(^1\Delta)$, in combination with an optically active media or lasing substance, such as iodine or fluorine.

One method presently in use for generating a stream of SDO involves a chemical reaction between chlorine gas and a basic solution of hydrogen peroxide, hereinafter referred to as basic hydrogen peroxide (BHP). The excited oxygen can then be added to a suitable lasing medium and the mixture passed through an optical resonator/cavity to bring about a lasing action.

These lasers have been found to be very useful but improved performance characteristics, especially in the area of materials supply and efficiency, is desirable. In particular, a number of problems in the supply, storage, and maintenance of the BHP reactant material has limited the use of these chemical lasers in military and airborne applications.

A high-performance tactical laser weapon requires a laser that operates on a sustained basis, providing rapid fire capability. Many lasers, such as chemical oxygen iodine lasers (COILs) (e.g., the Advanced Tactical Laser (ATL) Advanced Component Technology Demonstration (ACTD)), can operate only in a short lasing burst limited by the supply of BHP. Each burst is separated by a longer time period during which spent and excess BHP is recycled to support another lasing burst. This limits the utility of laser weapons and hence their potential.

In both the ATL and the airborne laser (ABL), the BHP is reacted as finely divided high-velocity jets or droplets with a low pressure chlorine stream. Current technology to provide continuous BHP circulation and lasing, e.g., the approach taken for ABL, takes advantage of the large, high interior of the Boeing 747 aircraft to meet this need. The liquid is separated from the low pressure product gas stream and coalesced into a largely gas-free stream suitable for reuse through centrifugal separators. These centrifugal separators are large, heavy, and utilize the height of the aircraft to gravitationally counteract viscous losses to prevent cavitation at the low pressures of the laser. Such a system and method are not adaptable to tactical platforms that are both much smaller and flatter.

The flow conditions at the location on the COIL device at which the BHP jets or droplets exit present conditions that are far outside of the conditions encountered in typical industrial phase separations, including distillation and gas/liquid separation or demisting. In comparison to distillation, the average liquid loading for laser usage is approximately 100 times that typically encountered, and peak locations have loadings of 1,000 times or higher than typically encountered in industrial applications. The liquid-to-gas weight ratio is also unusually high, running upwards of 10,000 compared to normal industrial distillation conditions of 10 or less. In industrial demisting applications, the liquid-to-gas weight ratio is even lower, typically 0.1 or lower.

Thus, no industrial technology is known that meets the flow control and gas/liquid separation requirements for laser applications. Accordingly, an apparatus and method for gas/liquid separation for laser applications adaptable to relatively smaller and flatter platforms are highly desirable.

SUMMARY

The present invention provides a novel approach to gas/liquid separation that avoids the use of a centrifugal separator and provides a more compact separation capability for lasers, such as COILs.

In accordance with an embodiment of the present invention, a gas/liquid separator for a chemical laser is provided, the separator including a plurality of substantially spherical aggregates of meshed material in a housing to receive a liquid and a gas to be separated, and an injector plate that provides the liquid to the plurality of substantially spherical aggregates of meshed material.

In accordance with another embodiment of the present invention, a gas/liquid separator for a chemical laser is provided, the separator including a plurality of substantially spherical aggregates of meshed material in a housing to receive a liquid and a gas to be separated, the liquid and the gas having a gas-to-liquid volume fraction up to about 50%; and an injector plate that provides jets of the liquid to the plurality of substantially spherical aggregates of meshed material, wherein the injector plate is configured to provide the liquid at velocities up to about 10 m/s.

In accordance with yet another embodiment of the present invention, a method for gas/liquid separation is provided, the method including providing a plurality of substantially spherical aggregates of meshed material in a housing; and flowing a liquid entrained with gas through the plurality of substantially spherical aggregates of meshed material, thereby separating the liquid from the gas.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
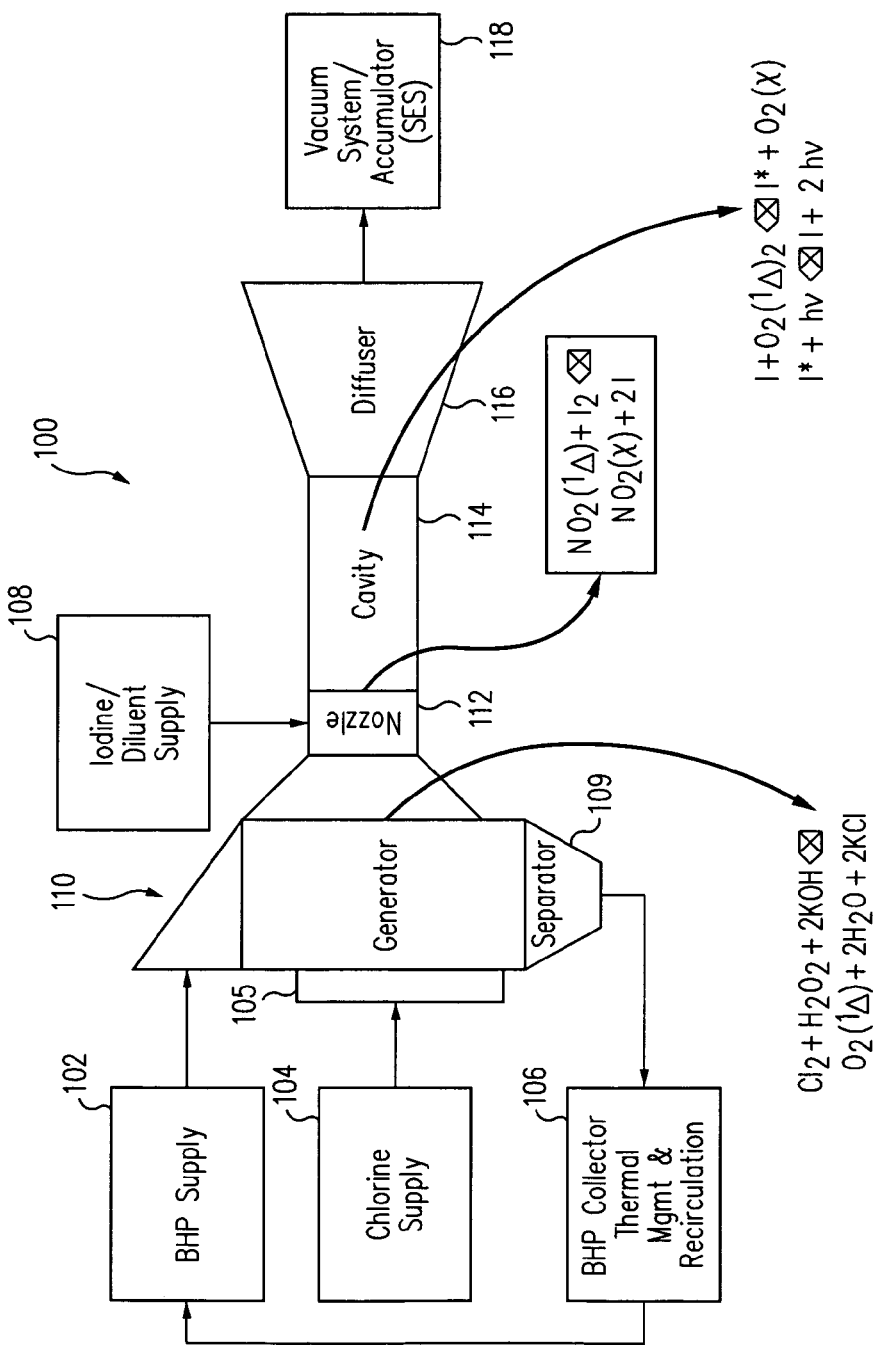
FIG. 1 shows a block diagram illustrating a laser system including a gas/liquid separator in accordance with an embodiment of the present invention.

Embodiments of the present invention and their advantages are best understood by referring to the detailed description that follows. It should be appreciated that like reference numerals are used to identify like elements illustrated in one or more of the figures. It should also be appreciated that the figures may not be necessarily drawn to scale.

DETAILED DESCRIPTION

FIG. 1 shows a block diagram illustrating a laser system 100 in accordance with an embodiment of the present invention. In one example, system 100 may be a chemical oxygen-iodine laser (COIL). System 100 includes a singlet delta oxygen (SDO or $O_2(^1\Delta)$) generator 110 operably coupled to a basic hydrogen peroxide (BHP) supply 102 and a chlorine supply 104. A gas/liquid separator 109 is operably coupled to generator 110 to separate spent and excess liquid reactants and products (i.e., spent and excess BHP and salts) from gas reactants and products. It is noted that gas/liquid separator 109 may be integral to generator 110 in one embodiment or a separate module in another embodiment. A BHP collector 106, which collects the separated liquid phase from gas/liquid separator 109, is optionally coupled to gas/liquid separator 109. In other embodiments, BHP collector 106 may further treat the separated liquid reactants and BHP (e.g., heat treatment via a heat exchanger). From either gas/liquid separator 109 or BHP collector 106, the separated BHP is then recirculated to BHP supply 102 for further use in the generation of SDO.

In one example, BHP supply 102 provides an aqueous mixture of hydrogen peroxide and a base. The base component may be selected from alkaline bases including but not limited to potassium hydroxide (KOH), sodium hydroxide (NaOH), and lithium hydroxide (LiOH), but KOH provides advantages such as low temperature and high concentration. In a further example, BHP can refer to an aqueous mixture of about 70 wt % hydrogen peroxide and about 45 wt % KOH. The BHP is used at low temperature, in one example between about −20° F. and about 0° F.

Chlorine supply 104 provides chlorine gas and, optionally, an inert gas such as argon, nitrogen, or helium, to be injected into the reaction chamber of generator 110 via a gas injector 105 to allow high total pressure operation of the device.

With the use of KOH in one example, the BHP and chlorine reactants undergo a reaction in generator 110 to generate SDO following the equation below.

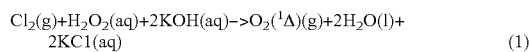

$$Cl_2(g)+H_2O_2(aq)+2KOH(aq)\rightarrow O_2(^1\Delta)(g)+2H_2O(l)+ 2KCl(aq) \quad (1)$$

Generator 110 produces the SDO energy carrier through a reaction of an aqueous mixture of hydrogen peroxide and potassium hydroxide (in this example the BHP), with gas-phase chlorine. Byproducts of this reaction are a salt (in this case potassium chloride), water, and heat. The potassium hydroxide neutralizes an intermediate product HCl thereby producing potassium chloride and water. The two-phase reaction shown in equation (1) is very exothermic, releasing most of the energy as heat into the BHP solution (110 kJ/mol) and maintaining the rest in an electronically excited state of oxygen called singlet delta oxygen.

The apparatus and method of the present invention may provide substantially continuous production of SDO by providing a substantially continuous flow of the BHP and chlorine reactants in accordance with an embodiment of the present invention.

The present invention provides a means of performing gas/liquid separation on an array of jets or streams of liquid such that high-velocity liquid flow with entrained gas is "quieted" to provide a uniform flow at moderate or low velocity from which the gas has been substantially completely separated from the liquid.

As noted above, the present invention operates under conditions of velocity (local and average) and liquid-to-gas weight and volume ratios that are outside of the normal range of conditions under which commercial gas/liquid systems, such as distillation columns, separators, and demisters, operate. For example, in comparison to distillation, the average liquid loading for laser usage is approximately 100 times that typically encountered, and peak locations have loadings of 1,000 times or higher than typically encountered in industrial applications. Liquid-to-gas weight ratio is on the order of 10,000 compared to typical industrial distillation conditions of 10 or less. In industrial demisting applications, the liquid-to-gas weight ratio is even lower, typically 0.1 or lower.

In accordance with an embodiment of the present invention, a gas/liquid separator is effective for liquid velocities up to approximately 10 m/s and gas-to-liquid volume fractions up to about 50%.

Figure 2:
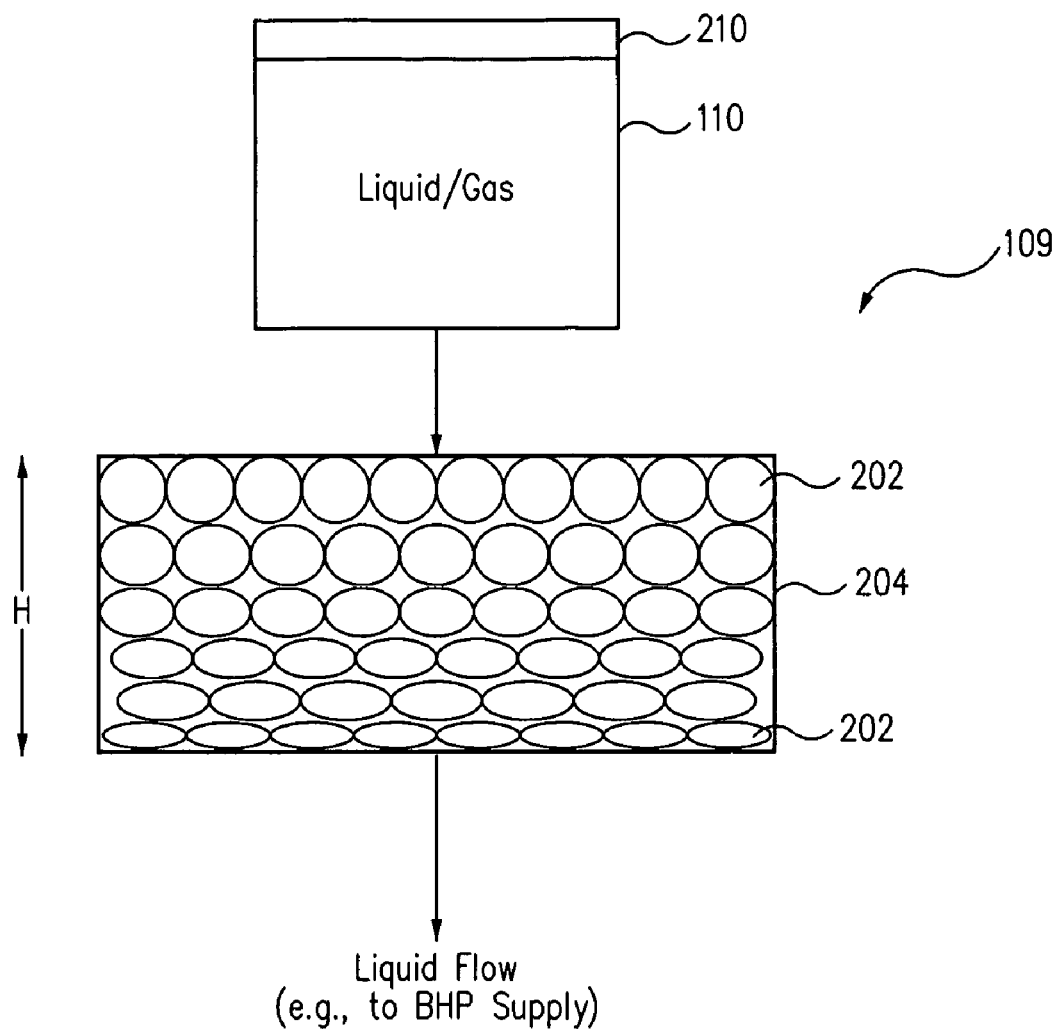
FIG. 2 shows a diagram illustrating a cross-section of a gas/liquid separation apparatus in accordance with an embodiment of the present invention.

Referring now to FIG. 2, a gas/liquid separator 109 is illustrated in accordance with an embodiment of the present invention. In one example, separator 109 includes a plurality of substantially spherical aggregates of meshed material 202 forming multiple layers in a housing 204. In one example, an injector plate 210 of generator 110 provides liquid which may be entrained with gas from gas injector 105 downstream of the injector plate. In another example, generator 110 provides a liquid and gas mixture to be separated. The injector plate may be configured to provide the liquid at velocities up to about 10 m/s. Gas and liquid are provided to the plurality of substantially spherical aggregates of meshed material 202 at gas-to-liquid volume fractions up to about 50%. Injector plate 210 preferably provides substantially vertical jets that do not impinge against the sidewalls of the separator housing. It is noted that injector plate 210 may be an integral part of generator 110 when separator 109 is integral to generator 110. It is further noted that housing 204 may have various shapes including but not limited to rectangular and cylindrical shapes.

The plurality of substantially spherical aggregates of meshed material 202 perform the quieting of the gas/liquid flow rapidly and with minimum or reduced height so as to meet the overall needs of the tactical laser weapon.

The present invention performs the desired gas/liquid separation and flow quieting under conditions meeting the requirements of a COIL device by using multiple layers of substantially spherical aggregates of meshed material 202. Such substantially spherical aggregates of meshed material may be similar to that used for personal hygiene (e.g., bathing) and commercially available under the term "loofa". The application of these substantially spherical aggregates of meshed material is unique to the present invention.

In one embodiment, the substantially spherical aggregates of meshed material include a metal or plastic structure. The metal may be selected from the group consisting of steel, aluminum, copper, titanium, tantalum, brass, nickel, and alloys thereof.

The substantially spherical aggregates of meshed material perform one or more of seven important steps for the gas/liquid separation process: (1) intercepting the intense jets of gas/liquid flow with minimal "splash-back"; (2) reducing the momentum of the jets; (3) spreading the flow so as to reduce the average velocity of the gas/liquid flow; (4) separating the liquid and gases; (5) coalescing the liquid jets into a homogeneous mass without trapping gas in the liquid; (6) expelling the gas from the liquid without causing entrainment of liquid in the gas stream; and (7) incorporating the coalesced jets into a liquid pool without further entrainment of liquid. As the liquid and gas flow through the spherical aggregates of meshed material, bubbles of gas move toward the sidewalls of the separator housing and the gas is continuously vented.

In one example, a thickness "H" of the multiple layers of substantially spherical aggregates of meshed material is controlled to achieve a desired level of momentum shedding, and in one example, has a thickness H between about 10 cm and about 20 cm. The thickness should be kept sufficiently short such that the flow does not flood the channels and foam over the top of the ribbed layers. The plurality of substantially spherical aggregates may occupy a volume between about 1.5 liters and about 3.0 liters. As more weight is provided over the bottom layers of meshed material than the top layers, the substantially spherical aggregates of meshed material may become more compressed from the top layer to the bottom layer. The layers of meshed material having different compression levels may provide different functionality for the gas/liquid separation process.

Figure 3:
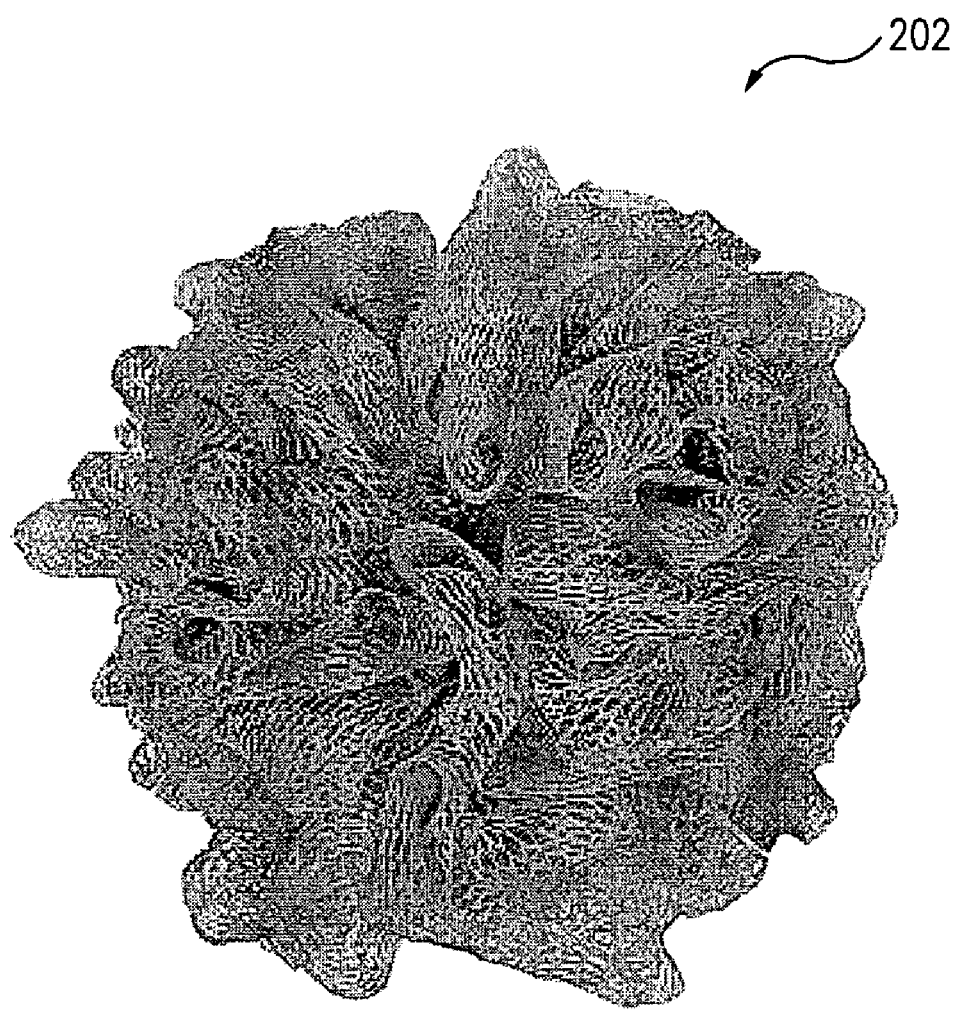
FIG. 3 shows a diagram illustrating a perspective view of an example of a substantially spherical aggregate of meshed material used in the gas/liquid separation apparatus in accordance with an embodiment of the present invention.

Referring now to FIG. 3, a perspective view is shown of an example of a substantially spherical aggregate of meshed material used in the gas/liquid separation apparatus in accordance with an embodiment of the present invention.

A class of non-traditional materials for gas-liquid separation is applicable under conditions related to the requirements in a COIL in accordance with an embodiment of the present invention. The materials are fine-scale plastic (or metal) meshes that are "bunched" at a center area to form larger-scale aggregates substantially spherical in shape. The bunched meshes are composed of wires smaller in diameter or width than the jets and droplets. The openings in the mesh material are of larger dimension, and the mesh material is more than about 80% open in one example. In a further example, the meshed material has openings between about 0.2 mm and about 2 mm in diameter.

The bunching occurs on a larger scale, typically 10-20 mesh spacings, and leaves a highly open structure with only a few volume percent wire in the aggregate material. In one example, a substantially spherical aggregate of meshed material has a diameter between about 5 cm and about 10 cm when not wet and/or compressed.

The bunching may be moderately random and leaves large flow passages intermixed with the small mesh openings. This material is highly effective at separating liquid and gas up to moderate liquid velocities and loadings, for example, liquid velocities up to about 10 m/s with gas-to-liquid volume fractions up to about 50%, while avoiding "flooding" (i.e., building up of a liquid layer) above the substantially spherical aggregates of meshed material. The complex set of dimensional scales appears to be important to the functioning of these bunched meshes for gas/liquid separation because the same mesh "folded" into a three-dimensional structure with a regular pattern instead of being bunched at a center area fails to produce effective gas/liquid separation.

Referring back to FIG. 1, an outlet of generator 110 is operably coupled to a supersonic nozzle 112, which is also operably coupled to an iodine supply 108. A laser cavity 114 is operably coupled to an outlet of nozzle 112, and a diffuser 116 is operably coupled to an outlet of cavity 114. Finally a sealed exhaust system 118, providing vacuum and accumulation of exhaust gases, is operably coupled to an outlet of diffuser 116.

Embodiments described above illustrate but do not limit the invention. It should also be understood that numerous modifications and variations are possible in accordance with the principles of the present invention. For example, a substantially spherical aggregate may have various diameters and dimensions of openings. Accordingly, the scope of the invention is defined only by the following claims.

I claim:

1. A gas/liquid separator for chemical lasers, comprising:
a housing; and
a plurality of substantially spherical aggregates of meshed material in the housing to receive a liquid entrained with a gas to be separated.

2. The separator of claim 1, wherein one of the plurality of substantially spherical aggregates of meshed material has a diameter between about 5 cm and about 10 cm.

3. The separator of claim 1, wherein the meshed material is about 80% open.

4. The separator of claim 1, wherein the meshed material has openings between about 0.2 mm and about 2.0 mm in diameter.

5. The separator of claim 1, Wherein the plurality of substantially spherical aggregates foi-m multiple layers having a total thickness between about 10 cm and about 20 cm.

6. The separator of claim 1, wherein the plurality of substantially spherical aggregates occupy a volume between about 1.5 L and about 3.0 L.

7. The separator of claim 1, wherein the plurality of substantially spherical aggregates of meshed material is configured to receive basic hydrogen peroxide.

8. The separator of claim 1, wherein the meshed material is comprised of a material selected from the group consisting of plastic and metal.

9. The separator of claim 1, wherein the meshed material is comprised of material selected from the group consisting of steel, aluminum, copper, titanium, tantalum, brass, nickel, and alloys thereof.

10. The separator of claim 1, wherein the plurality of substantially spherical aggregates of meshed material is configured to receive the liquid from an injector plate that provides jets of the liquid in a substantially vertical direction.

11. The separator of claim 10, wherein the plurality of substantially spherical aggregates of meshed material is configured to receive the liquid from the injector plate at velocities up to about 10 m/s.

12. The separator of claim 1, wherein the plurality of substantially spherical aggregates of meshed material is configured to receive the liquid entrained with the gas to be separated having a gas-to-liquid volume fraction up to about 50%.

13. A singlet delta oxygen generator for chemical lasers, comprising:
an injector plate that provides jets of a liquid at velocities up to about 10 m/s;
a gas injector that provides a gas to be mixed with the liquid; and a plurality of substantially spherical aggregates of meshed material in a housing to receive the liquid and the gas for separation, the liquid and the gas having a gas-to-liquid volume fraction up to about 50%.

14. The generator of claim 13, wherein one of the plurality of substantially spherical aggregates of meshed material has a diameter between about 5 cm and about 10 cm.

15. The generator of claim 13, wherein the meshed material is about 80% open.

16. The generator of claim 13, wherein the meshed material has openings between about 0.2 mm and about 2.0 mm in diameter.

17. A method of gas/liquid separation, comprising:
providing a plurality of substantially spherical aggregates of meshed material in a housing; and
flowing a liquid entrained with gas through the plurality of substantially spherical aggregates of meshed material, thereby separating the liquid from the gas.

18. The method of claim 17, wherein the liquid is provided to the plurality of substantially spherical aggregates of meshed material at velocities up to about 10 m/s.

19. The method of claim 17, wherein the liquid entrained with gas is provided to the plurality of substantially spherical aggregates of meshed material at a gas-to-liquid volume fraction up to about 50%.

20. The method of claim 17, further comprising cycling the separated liquid to a liquid reactant supply for a chemical oxygen iodine laser.

* * * * *